(12) United States Patent
Howard et al.

(10) Patent No.: US 12,456,467 B2
(45) Date of Patent: Oct. 28, 2025

(54) EMOTION-BASED VOICE CONTROLLED DEVICE

(71) Applicants: Newton Howard, Potomac, MD (US); Mustak Ibn Ayub, Oxford (GB)

(72) Inventors: Newton Howard, Potomac, MD (US); Mustak Ibn Ayub, Oxford (GB)

(*) Notice: Subject to any disclaimer, the term of this patent is extended or adjusted under 35 U.S.C. 154(b) by 0 days.

(21) Appl. No.: 18/449,172

(22) Filed: Aug. 14, 2023

(65) Prior Publication Data
US 2023/0386474 A1    Nov. 30, 2023

Related U.S. Application Data

(63) Continuation of application No. 17/571,860, filed on Jan. 10, 2022, now Pat. No. 11,727,938, which is a
(Continued)

(51) Int. Cl.
| | |
|---|---|
| *G10L 25/63* | (2013.01) |
| *G06F 40/242* | (2020.01) |
| *G06F 40/30* | (2020.01) |
| *G10L 15/22* | (2006.01) |
| *G10L 15/26* | (2006.01) |
| *G10L 15/32* | (2013.01) |
| *G06F 16/2457* | (2019.01) |
| *G06F 16/9535* | (2019.01) |

(Continued)

(52) U.S. Cl.
CPC ............ *G10L 15/32* (2013.01); *G06F 40/242* (2020.01); *G10L 15/22* (2013.01); *G10L 15/26* (2013.01); *G10L 25/63* (2013.01); *G06F 16/2457* (2019.01); *G06F 16/24578* (2019.01); *G06F 16/9535* (2019.01); *G06F 40/279* (2020.01); *G06F 40/295* (2020.01); *G10L 15/1807* (2013.01); *G10L 15/183* (2013.01); *G10L 2015/223* (2013.01); *G10L 2015/227* (2013.01); *G10L 15/24* (2013.01)

(58) Field of Classification Search
None
See application file for complete search history.

(56) References Cited

U.S. PATENT DOCUMENTS

| | | | |
|---|---|---|---|
| 8,356,025 B2 * | 1/2013 | Cai ................ | G06F 40/30 |
| | | | 707/769 |
| 8,515,828 B1 * | 8/2013 | Wolf ............... | G06Q 30/02 |
| | | | 705/26.7 |

(Continued)

*Primary Examiner* — Richard Z Zhu
(74) *Attorney, Agent, or Firm* — Michael A. Schwartz

(57) ABSTRACT

Embodiments may process search input for different users based on classifications of information and based on emotional content of search commands from the users. For example, a method may comprise receiving, at a computer system, speech data from a client device, the speech data representing a voice command from a user, obtaining, at the computer system, a plurality of items of content responsive to the voice command by searching for content, determining, at the computer system, at least one class related to the voice command, classifying, at the computer system, each obtained item of content into at least one class, identifying, at the computer system, at least one item of content classified into at least one class related to the voice command, and transmitting, at the computer system, the at least one identified item of content.

14 Claims, 11 Drawing Sheets

Related U.S. Application Data continuation of application No. 16/558,627, filed on Sep. 3, 2019, now Pat. No. 11,257,500.

(60) Provisional application No. 62/726,672, filed on Sep. 4, 2018.

(51) Int. Cl.
- *G06F 40/279* (2020.01)
- *G06F 40/295* (2020.01)
- *G10L 15/18* (2013.01)
- *G10L 15/183* (2013.01)
- *G10L 15/24* (2013.01)

(56) References Cited

U.S. PATENT DOCUMENTS

| | | | |
|---|---|---|---|
| 8,918,320 B2 * | 12/2014 | Adler | G10L 25/63 704/251 |
| 9,922,642 B2 | 3/2018 | Pitschel | |
| 10,068,059 B2 | 9/2018 | Moturu | |
| 10,216,850 B2 * | 2/2019 | Kazi | G06F 40/30 |
| 10,242,074 B2 * | 3/2019 | Kazi | G06F 16/24578 |
| 10,387,805 B2 * | 8/2019 | Katz | G06Q 10/00 |
| 10,832,684 B2 | 11/2020 | Sarikaya | |
| 2003/0167167 A1 | 9/2003 | Gong | |
| 2010/0169091 A1 | 7/2010 | Zurek | |
| 2013/0325877 A1 | 12/2013 | Niazi | |
| 2015/0039292 A1 * | 2/2015 | Suleman | G10L 15/22 704/9 |
| 2015/0088894 A1 | 3/2015 | Czarlinska | |
| 2016/0154825 A1 | 6/2016 | Yao | |
| 2017/0220578 A1 * | 8/2017 | Kazi | G06Q 50/01 |
| 2017/0345424 A1 | 11/2017 | Ikeno | |
| 2018/0039647 A1 | 2/2018 | Winstanley | |
| 2018/0101776 A1 | 4/2018 | Osotio | |
| 2018/0260486 A1 | 9/2018 | Howard | |
| 2018/0308487 A1 | 10/2018 | Goel | |
| 2020/0020316 A1 * | 1/2020 | Des Jardins | G10L 15/22 |
| 2020/0075027 A1 | 3/2020 | Arantes | |
| 2020/0401639 A1 | 12/2020 | Kussmaul | |

* cited by examiner

Fig. 6

```
Title: "You Won't See Me Anymore" Really SAD English Song | New English Song "2017"
Views:2590260
Url:https://www.youtube.com/watch?v=Q4Hn10r7Dg
Thumbnail:https://i.ytimg.com/vi/Q4Hn10r7Dg/default.jpg
Description: DOWNLOAD FREE MP3 : https://abhi.world/downloads/ ♥♥♥ The saddest thing in the world is loving someone who
doesn't love you back♥♥ ♥♥[Lyrics ....
Duration:4M:33

Comments for Video: "You Won't See Me Anymore" Really SAD English Song | New English Song "2017"
    "Comments": "Nice😊",
    "Comments": "I'm a loser. i have no friends \n😢 but i am happy \nbecause no one can break my heart 😊😊",
    "Comments": "very heart touching",
    "Comments": "whos still listening this in 2017......",
    "Comments": "I like so this song",
    "Comments": "+91 9915928956 Are you facing problems in your love life? is your lover not getting extracted towards
you\nAre you very tensed for getting your love back\nif you are facing problems in your life, then you should not ignore it.
Try to get your love problems solved easily and quickly the help of Vedic Astrology and siddhi. Pandit manoj sharma ji is a very
renowned astrologer from india who is now famous all across the globe for his excellent Vashikaran Siddhi. He has solved the
problems of thousands of Indian and international families so far in his career of Astrology. He is a love specialist and his
Vashikaran mantra for love in Hindi is very useful in getting your ex love back. if you want to have your lover, wife or girl
friend back in your life then you should get the special\nVashikaran Mantras from Pandit jee and your all love problems will be
resolved gradually. He gives you the mantra through which you can control your wife, lover or ex love. Also he has\nundeveloped
different kind of mantras like\n—Vashikaran mantra for husband\n— Vashikaran mantra for woman\n— Vashikaran mantra for
girl\n— Vashikaran mantra for lady\n— Vashikaran mantra to get you love back\nCall at the numbers given below or write in
mail your problem to get the instant solution of all your love problems solve by baba ji \n +91 9915786525",
    "Comments": "sad songs..nice song",
    "Comments": "sad songs..nice song",
    "Comments": "im crying to i very saddddddddddddddddddddddd!!",
    "Comments": "ilove this song.......",
    "Comments": "so painfull song",
    "Comments": "Good songs i cant dislike this songs keep it up",
    "Comments": "amipp",
    "Comments": "we vr hvin normal chats but\nsuddenly BLOCKD \nno reason \nno msg\nno reaction",
    "Comments": "yesterday my gf she told i never call you and never chat with you 😭 what i'll do right now i don't have
anyone in my life so that am going to die",
    "Comments": "It's boring",
```

Fig. 8

| 802 | 804 | 806 |
|---|---|---|
| sleep: | 349.217750549 | 823.030348406, |
| relaxing: | 305.745566882 | 711.790817773, |
| asleep: | 219.142945024 | 446.350716474, |
| brick: | 88.9801496843 | 115.508176393, |
| cinema: | 81.5242331764 | 112.315294291, |
| calming: | 156.600958099 | 345.741941302, |
| yellow: | 93.9212559952 | 169.509474697, |
| launched: | 55.570296794 | 73.9101467969, |
| relax: | 162.535567552 | 402.959162624, |
| meditation: | 134.673119197 | 334.036395638, |
| sleepy: | 66.9264406043 | 120.88742672, |
| margie: | 31.1894750101 | 36.3594000115, |
| calm: | 164.031916113 | 482.199461509, |
| subscribers: | 67.4496691446 | 137.995617762, |
| peaceful: | 163.401709331 | 484.247423193, |
| helps: | 209.426246231 | 684.022112829, |
| goodnight: | 45.3862020195 | 78.9548707128, |
| sleeping: | 99.3055928899 | 251.242316962, |
| thrilled: | 29.7548875022 | 40.7548875022, |
| viewers: | 46.2646625065 | 84.1894750101, |
| soothing: | 132.654900433 | 391.719576742, |
| classical: | 66.5885484986 | 152.217386718, |
| slept: | 52.6454842904 | 107.986962394, |
| streams: | 22.1699250014 | 28.1699250014, |
| calmed: | 40.8317030992 | 76.3824498846, |
| composers: | 48.1715531021 | 98.3431062042, |
| lullaby: | 44.3398500029 | 91.552374886, |
| announce: | 20.0 | 28.0, |
| fall: | 155.375742239 | 532.231101632, |
| stress: | 90.2666232215 | 264.084898943, |

EMOTION-BASED VOICE CONTROLLED DEVICE

CROSS-REFERENCE TO RELATED APPLICATIONS

This application is a continuation of U.S. patent application Ser. No. 17/571,860, filed Jan. 10, 2020, now U.S. Pat. No. 11,727,938, issued Aug. 15, 2023, which is a continuation of U.S. patent application Ser. No. 16/558,627, filed Sep. 3, 2019, now U.S. Pat. No. 11,257,500, issued Feb. 22, 2022, which claims the benefit of U.S. Provisional Application No. 62/726,672, filed Sep. 4, 2018, the contents of which are incorporated herein in their entirety.

BACKGROUND

The present invention relates to processing search input dynamically for different users based on classifications of information associated with content to be searched for, and based on emotional content of search commands from the users.

Current voice controlled devices give contents, such as music, news, games, etc., based on users' requests as 'static input'. Such devices do not consider the reason behind the requests from the users. As a result the same search string brings the same results for different users. For example, if there is a request for a search to 'play a relaxing song' through a voice controlled device, it may take all the users to the same station.

However, based on the personality, upbringing, background, and other factors of the users, the recommendations should be different for each user. Thus, instead of considering the requests from users as 'static inputs', a need arises for techniques to make the search 'dynamic' for different users.

SUMMARY

Embodiments of the present systems and methods may provide techniques for processing search input dynamically for different users based on classifications of information associated with content to be searched for, and based on emotional content of search commands from the users. Based on a minimum set of non-invasive information about the users, embodiments may provide contents for the users. The contents may be able bring a positive change if the users are in a negative emotional state. Embodiments may provide a voice controlled device that understands users' emotion and empathetically recommends songs, news, games, and other content.

For example, in an embodiment, a method may comprise receiving, at a computer system comprising a processor, memory accessible by the processor, and computer program instructions stored in the memory and executable by the processor, speech data from a client device, the speech data representing a voice command from a user, obtaining, at the computer system, a plurality of items of content responsive to the voice command by searching for content, determining, at the computer system, at least one class related to the voice command, classifying, at the computer system, each obtained item of content into at least one class, identifying, at the computer system, at least one item of content classified into at least one class related to the voice command, and transmitting, at the computer system, the at least one identified item of content.

In embodiments, the method may further comprise converting the speech data to text and the search for content is performed using the text. The classes may relate to emotional states and the at least one class related to the voice command is an emotional state of the user determined by analyzing the text. Each obtained item of content may be classified into at least one content class using text data associated with each item of content. Each obtained item of content may be classified into at least one content class using text data associated with each item of content by counting, at the computer system, occurrences of words in the text data associated with each item of content, wherein the counted words are included in a dictionary for each content class including a ranking of emotional words, determining, at the computer system, an apparent number of occurrences of each word in the text data associated with each item of content, determining, at the computer system, a contextual weight of each word in the text data associated with each item of content with respect to the item of content, determining, at the computer system, a weight of each word in the text data associated with each item of content, determining, at the computer system, a score for each class for each item of content based on the counted occurrences of words, the determined apparent number of occurrences of each word, the determined contextual weight of each word, and the determined weight of each word, and classifying, at the computer system, each item of content into at least one content class based on the determined score for each class. The dictionary may be obtained by for each class, building, at the computer system, a dictionary including a minimum set of words that determines the class, building, at the computer system, a corpus of text data associated with a plurality of items of content, searching, at the computer system, the corpus of text data to find words neighboring or related to word in the dictionary, and extending, at the computer system, the dictionary to include the words found in the search. The method may further comprise repeating the building, searching, and extending until all words in the corpus have relative importance scores based on the classes.

In an embodiment, a system may comprise a processor, memory accessible by the processor, and computer program instructions stored in the memory and executable by the processor to perform receiving speech data from a client device, the speech data representing a voice command from a user, obtaining a plurality of items of content responsive to the voice command by searching for content, determining at least one class related to the voice command, classifying each obtained item of content into at least one class, identifying at least one item of content classified into at least one class related to the voice command, and transmitting the at least one identified item of content.

In an embodiment, a computer program product may comprise a non-transitory computer readable storage having program instructions embodied therewith, the program instructions executable by a computer comprising a processor, memory accessible by the processor, and computer program instructions stored in the memory and executable by the processor, to cause the computer to perform a method comprising receiving, at the computer system, speech data from a client device, the speech data representing a voice command from a user, obtaining, at the computer system, a plurality of items of content responsive to the voice command by searching for content, determining, at the computer system, at least one class related to the voice command, classifying, at the computer system, each obtained item of content into at least one class, identifying, at the computer system, at least one item of content classified into at least one class related to the voice command, and transmitting, at the computer system, the at least one identified item of content.

BRIEF DESCRIPTION OF THE DRAWINGS

The details of the present invention, both as to its structure and operation, can best be understood by referring to the accompanying drawings, in which like reference numbers and designations refer to like elements.

FIG. 6 is an exemplary illustration of text associated with content according to embodiments of the present systems and methods.

FIG. 8 is an exemplary illustration of search words according to embodiments of the present systems and methods.

DETAILED DESCRIPTION

Embodiments of the present systems and methods may provide techniques for processing search input dynamically for different users based on classifications of information associated with content to be searched for, and based on emotional content of search commands from the users. Based on a minimum set of non-invasive information about the users, embodiments may provide contents for the users. The contents may be able bring a positive change if the users are in a negative emotional state. Embodiments may provide a voice controlled device that understands users' emotion and empathetically recommends songs, news, games, and other content.

Figure 1:
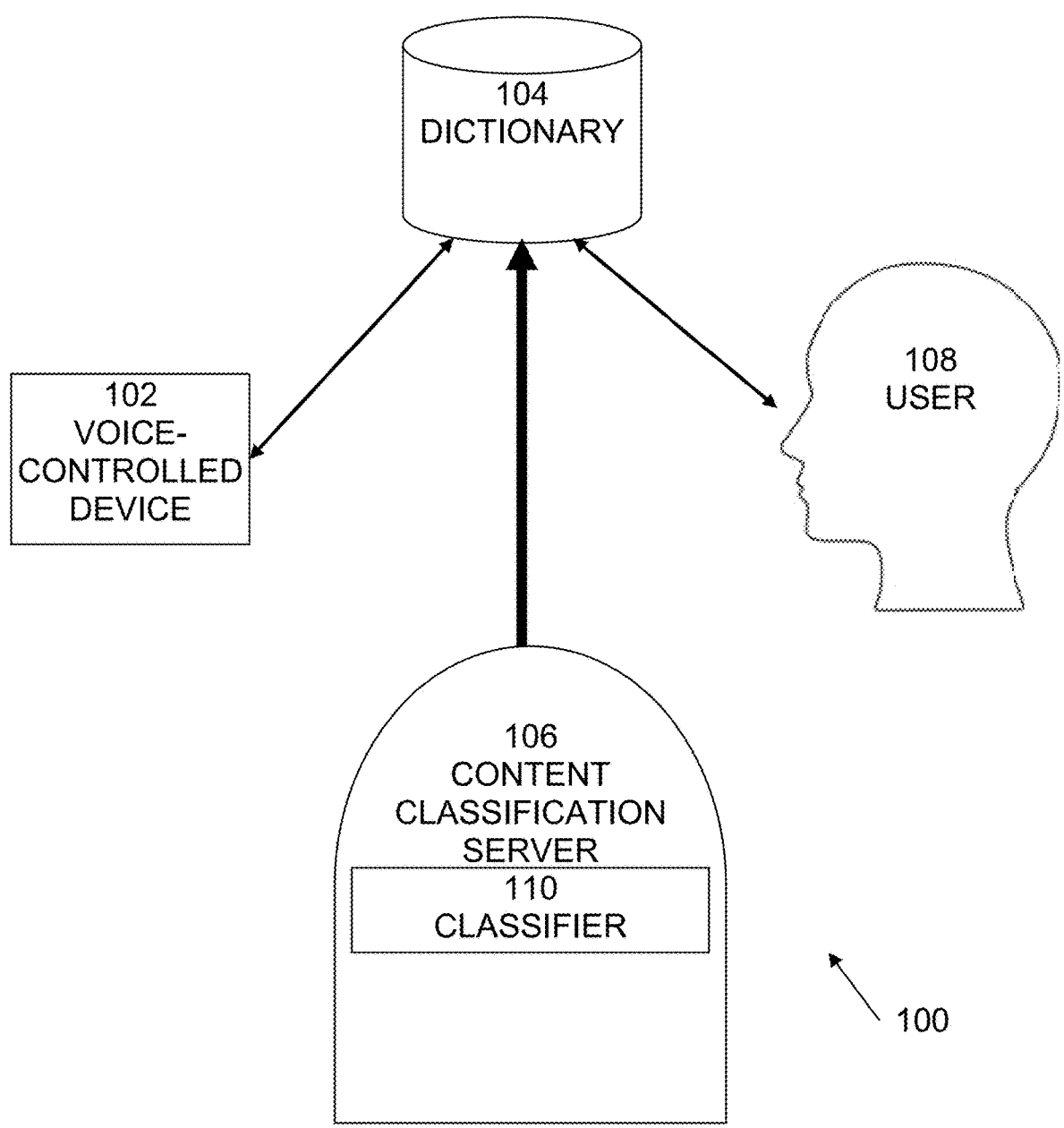
FIG. 1 illustrates an exemplary block diagram of a system in which embodiments of the present systems and methods may be implemented.

An exemplary block diagram of a system 100, in which embodiments of the present systems and methods may be implemented is shown in FIG. 1. In this example, system 100 includes voice controlled device 102, dictionary 104, content classification server 106, and user 108. In embodiments, voice controlled device 102 may include a processor, memory, audio input and output circuitry and software for 'voice command' detection from user 108, and communication circuitry and software for relaying the request to content classification server 106 where the voice command request may be processed by key words analysis.

Content classification server 106 may provide a classifier 110 to classify content based on its emotional qualities. Classifier 110 may use a dictionary 104 to categorize content into a plurality of classes, for example, six different classes, based on the ability of the content to change an emotional state of user 108. For example, the dictionary 104 may categorize content, such as songs, as, for example, De-stressing (relaxing), motivating, distracting, uplifting, suppressing and reappraisal.

Voice controlled device 102 may ask user 108 about their current emotional state. Based on such feedback, voice controlled device 102 play contents from the aforementioned categories. In addition, voice commands from user 108 may be analyzed to determine information relating to the user's emotional state and content relating to the user's emotional state may be played, even if user 108 did not explicitly ask for such content.

For registered users, the device may build a profile including their personality types, for example, according one or more personality tests. Based on the profile of the users, the song suggestions may be different.

Figure 2:
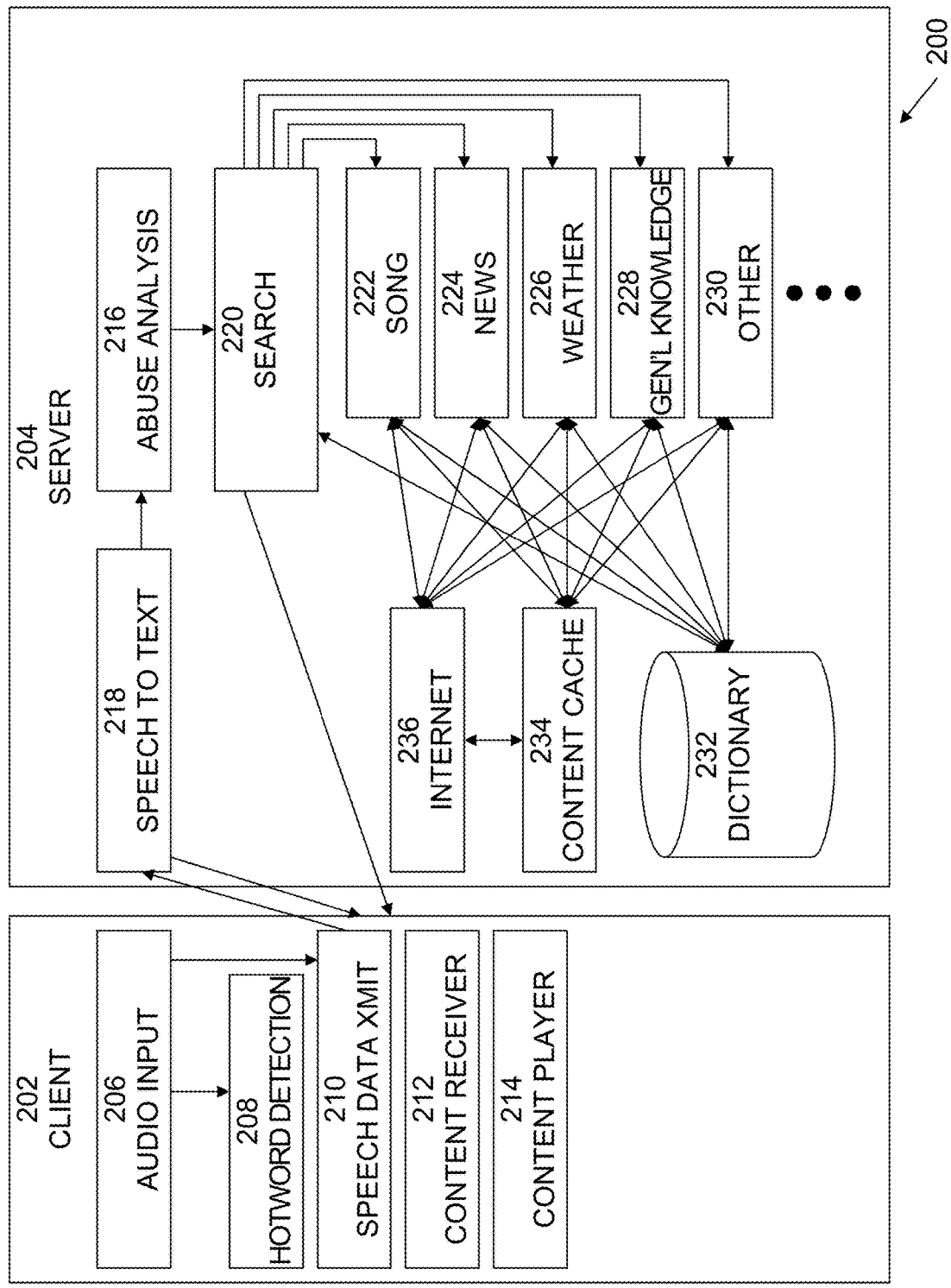
FIG. 2 is an exemplary block diagram of embodiments of a voice control system and processing according to embodiments of the present systems and methods.

An exemplary block diagram of embodiments of a voice control system 200 and processing according to embodiments of the present systems and methods is shown in FIG. 2. In this example, system 200 includes client 202 and server 204. Client 202 may include circuitry and software blocks such as audio input block 206, hotword detection block 208, speech data transmitting block 210, content receiver block 212 and content player block 214. Server 204 may include circuitry and software blocks such as abuse analysis block 216, speech to text block 218, search block 220, song search block 222, news search block 224, weather search block 226, general knowledge search block 228, other search blocks 230, dictionary 232, and content cache 234. Further, server 204 may be communicatively connected to the Internet 236.

Figure 3:
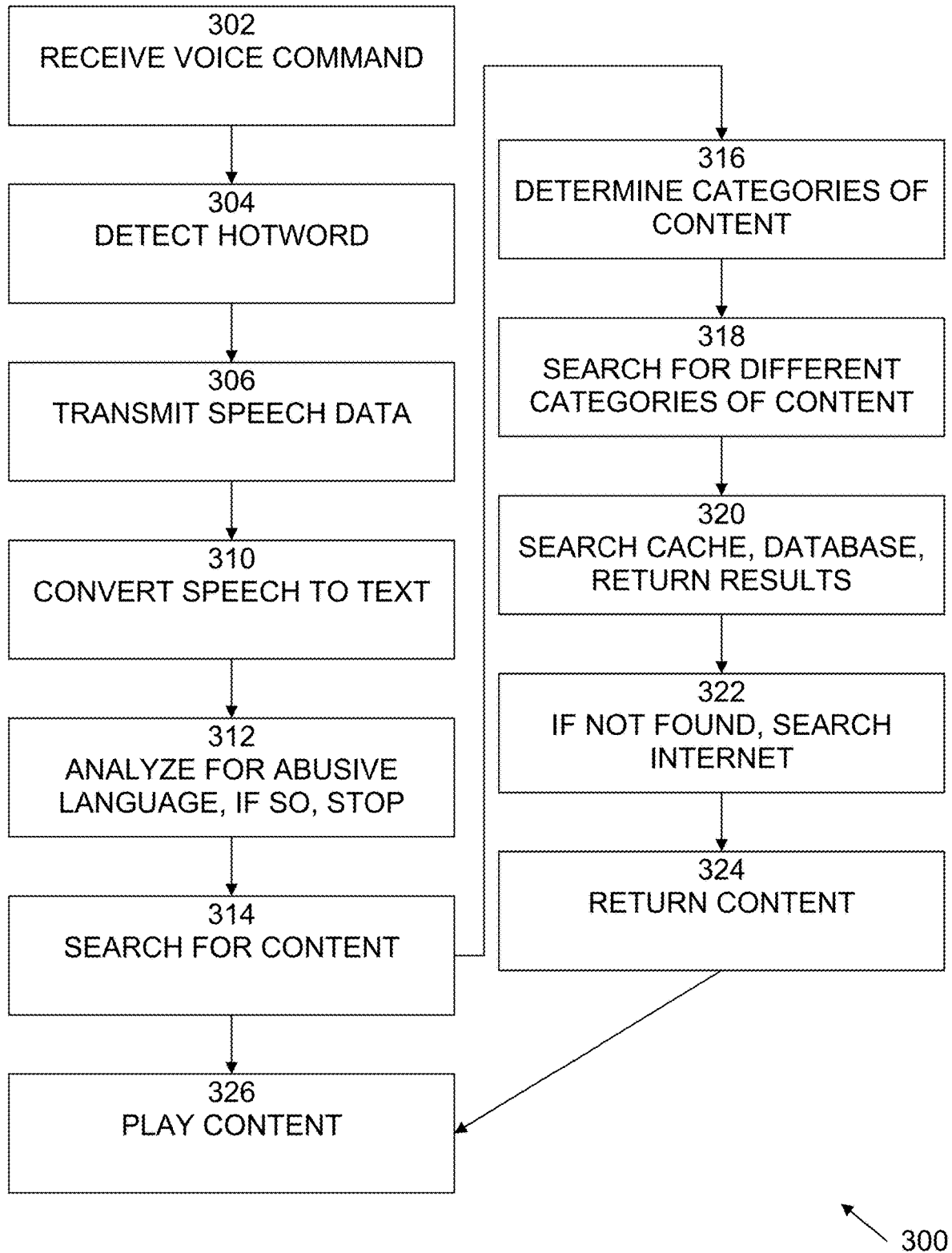
FIG. 3 is an exemplary flow diagram of a process of operation of embodiments of the present systems and methods.

The operation of system 200 is best understood with further reference to FIG. 3, which is a flow diagram of process 300 performed by system 200. Process 300 begins with 302, at which client 202 may receive one or more voice commands, such as a search query, from a user. The voice commands may be received by audio input block 206, which may digitize the voice commands to form audio speech data for software processing. The speech data may be transmitted to hotword detection block 208 to detect command hotwords directly on client 202. Hotword detection block 208 may provide multiple hotword handling including wake up client 202 upon hotword detection, as well as recognizing an performing client 202 commands, such as volume up/down, pause, resume, etc. These hotwords and commands may be to communicate with and control client 202.

At 306, the speech data may be further transmitted to server 204 by speech data transmitting block 210. For example, voice commands that are not recognized as hotwords and commands for client 202 may be transmitted to server 204 for processing. At 310, speech to text block 218 may receive the speech data and may convert the speech data to text. In embodiments, speech to text block 218 may itself convert the speech data to text. In embodiments, speech to text block 218 may transmit the speech data to an external server and/or a cloud-based service for conversion of the speech data to text. For example the speech data may be base64 encoded voice data from client and may include client credentials. Speech to text block 218 may call, for example, the GOOGLE® speech to text application program interface (API) to perform the speech data to text conversion.

At 312, the converted text may be transmitted to abuse analysis block 216 and analyzed for abusive language. In embodiments, a 2-filter analysis may be used. For example, if a voice command includes abusive language, or if a user searches for abusive content via voice command, the search may be transcribed into text format and analyzed with an abuse filter. If that analyzer marks the text as abusive, the program may stop processing of the voice command and may return an error or other indication to client 202. The abusive-language analysis may be performed for one or more languages, for example, Bengali and English. The second filter may detect if the abusive analysis of the first filter fails, or if abusive contents are present in the search results even though the query itself is not abusive at all. In those cases, the program may process the contents data, such as the title or description of the content and may analyze this data for abusive language. If anything abusive is found, the content play may be aborted and a pre-recoded message may be played.

At 314, if abuse analysis block 216 does not find abusive language in the converted text of the search query, search block 220 may perform searching for content responsive to the search query. In embodiments, well-known natural language processing (NLP) techniques may be used for the search. In addition, the text of the search query may be analyzed to determine information relating to the user's emotional state and search block 220 may perform searching for content relating to the user's emotional state, even if the search query does not explicitly request such content.

In embodiments, at 316, categories of content to be searched for may be determined. For example, categories of content may include songs, videos, news, weather, general knowledge, and any other categories of content. Search block 220 may use, for example, dictionary 232, which may include terms representative of classes of content, to classify the search query in terms of classes of content to search for that may be responsive to the search query. Further, search blocks 222-230 may use dictionary 232 to classify content found as a result of searching into different classes of content. Dictionary 232 and classes of content are described further below.

At 318, such categories of content may be searched for by, for example, song search block 222, news search block 224, weather search block 226, general knowledge search block 228, and any other search blocks 230. In embodiments, at 320, content cache 234 may be searched first and any content results found in content cache 234 may be returned. In embodiments, at 322, if no content results are found in content cache 234, if no content results for one or more categories are found in content cache 234, or if insufficient content results or categorical class results are found in content cache 234, the Internet may be searched for content. In embodiments, at 320, dictionary 232 may be used to classify content found as a result of searching into different classes of content. At 324, the content results of the appropriate classes that were found, whether in content cache 234 or internet 236, may be returned to client 202. At 326, content receiver block 212 may receive the content and content player 214 may play, display, or otherwise provide the content to a user.

In embodiments, after getting the result, client 202 may extract the audio portion and start downloading and streaming the audio immediately. Client 202 may include a multithreaded Client based program that takes voice command from user, puts the command in working queue and processes the commands in real time one by one. An application program interface (API) may be provided to handle client requests. Such an API handle many requests in real time and deliver the response back to client 202 in real time.

Server 204 may process the client input speech data according to users' needs and using the processed raw data, the server may retrieve results from different sources, for example, for songs it may use YOUTUBE® or other media content sites, for news it may use news sites, and for general knowledge or weather forecast, it may use designated sites or databases.

Non-invasive user information, such as search history, likes/dislikes, time of using the devices, etc., may be used to build a user oriented model, thus the system can understand each user's likes/dislikes of songs, news, information, etc., to make the system more responsive and more user friendly.

The device can process user voice data in multiple languages, such as Bengali, English and Hindi Languages.

Figure 4:
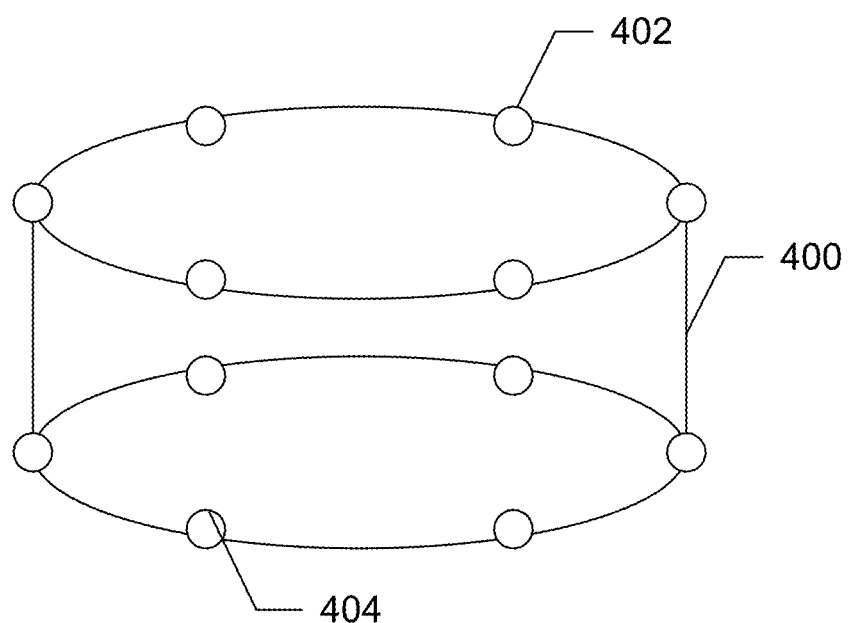
FIG. 4 is an exemplary illustration of an embodiment of a client device according to embodiments of the present systems and methods.

An exemplary illustration of an embodiment of a client device 400 is shown in FIG. 4. In this example, client device 400 may be generally disc shaped and may include a plurality, such as six, audio input devices 402, such as microphones, and may include a plurality, such as six, audio output devices, such as speakers 404. In embodiments, the audio input may be an array of 6 microphones that are arranged on the top part of a two layered board. The bottom part may hold an array of 6 speakers that directs the sound away from the device. This design will allow the maximum capture of the input sound while client device 400 is playing content.

In embodiments, client device 400 may include hardware components such as sound input and output modules, such as audio input block 206 and content player block 214, shown in FIG. 2. Embodiments may include a processing system such as an Orange Pi board with 2 GB of memory and a sound card. Such an embodiment may support an open source operating system, as well as Wi-Fi and LAN for internet connectivity. It is to be noted that the embodiment shown in FIG. 4 is merely an example of a client device. Embodiments may include any type of device, including special purpose devices, stand-alone devices, apps on other devices, such as smartphones, tablets, computers, etc.

Client device 400 may include software components, such as hotword detection block 208, which may be developed based on an open source code. After detecting the hot word, client device 400 may wait for the next instruction where the user can instruct the device to play songs or other content from, for example, YOUTUBE®. On such a command, client device 400 may relay the instructions server 204, where the instruction will be analyzed before bringing the requested content from the Internet, for example, YOUTUBE®. Such instructions may also provide content from news outlets, weather forecasting sites, etc.

Embodiments may provide classification of contents. For example, content may be provided that has the ability to regulate or alter negative human emotions such as anger, demotivation, stress, sadness etc. It is a well-known phenomenon that songs can affect human emotions. For a long time, music has been used for regulating negative human emotions. However, such application is still limited. Embodiments may classify, for example, songs to cope with, for example, at least six negative emotions.

Figure 5:
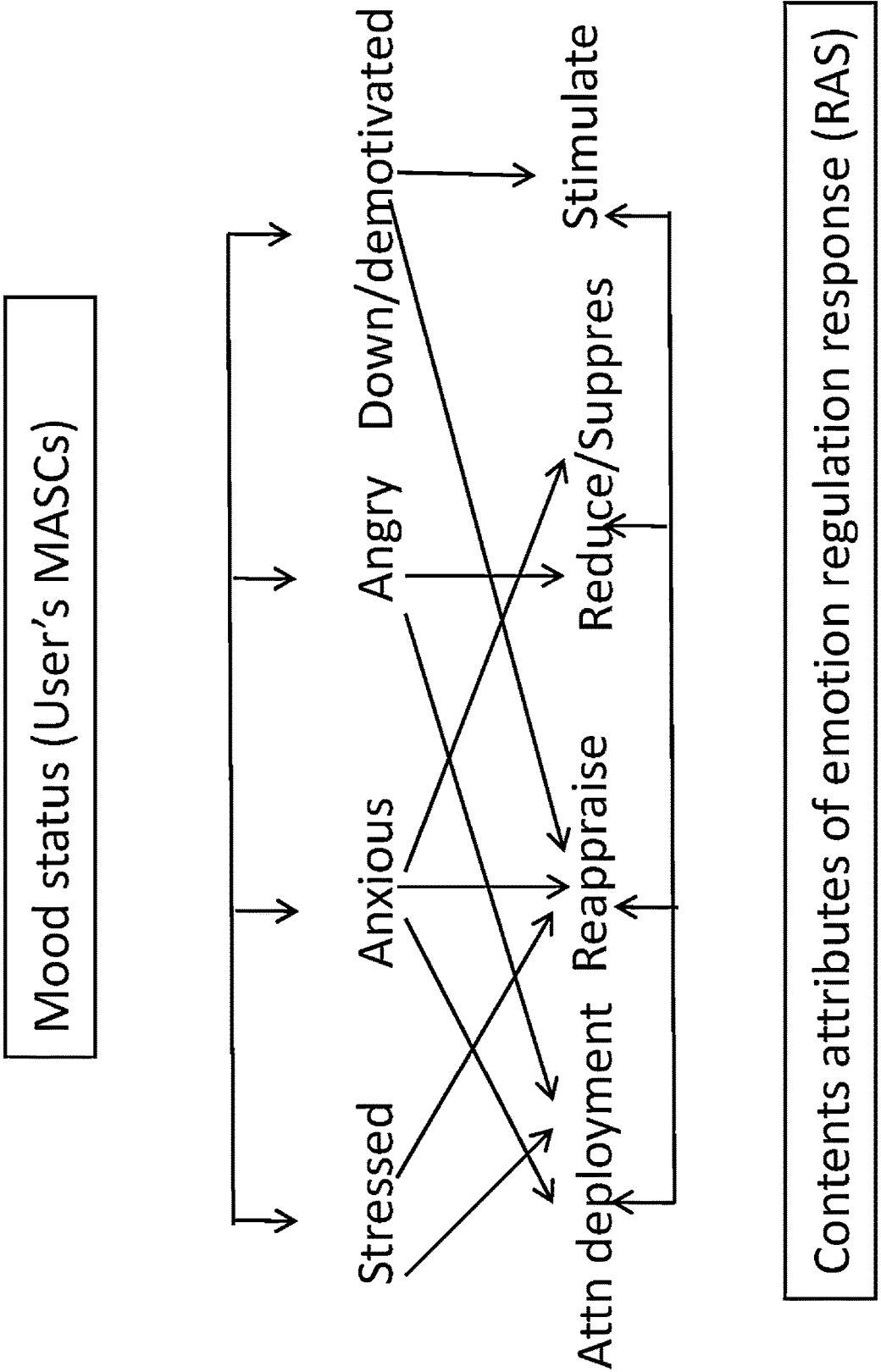
FIG. 5 is an exemplary map of how the different emotional states of users and their regulatory their regulatory techniques are linked according to embodiments of the present systems and methods.

FIG. 5 shows a map of how the different emotional states 500 of users and their regulatory their regulatory techniques are linked. FIG. 5 shows how content, such as songs, etc., may have attributes, such as De-stressing (relaxing), motivating, distracting, uplifting, suppressing and reappraisal, and may be used for regulating negative states, such as stress, demotivation, anger, sadness etc. Such relations are described in more detail in U.S. Patent Application Publication 2018/0260486 A1, the contents of which are incorporated herein by reference.

Embodiments may solve the classification problem for, for example, songs. Songs are good candidates, because, firstly, they are well known to be able to regulate human emotions and secondly, people often express their feelings after listening to the song(s). A typical comment section of, for example, a YOUTUBE® song, an example of which is shown in FIG. 6, may be a rich source of information about emotions evoked by the song in the listeners.

Embodiments may extract information about the feelings evoked in a listener after listening to one or more songs by analyzing the comment sections of the songs. Based on the emotion related information detected in the comment section of a song, the song may be added to one or more of, for example, six classes: De-stressing (relaxing), motivating, distracting, uplifting, suppressing and reappraisal.

Figure 7:
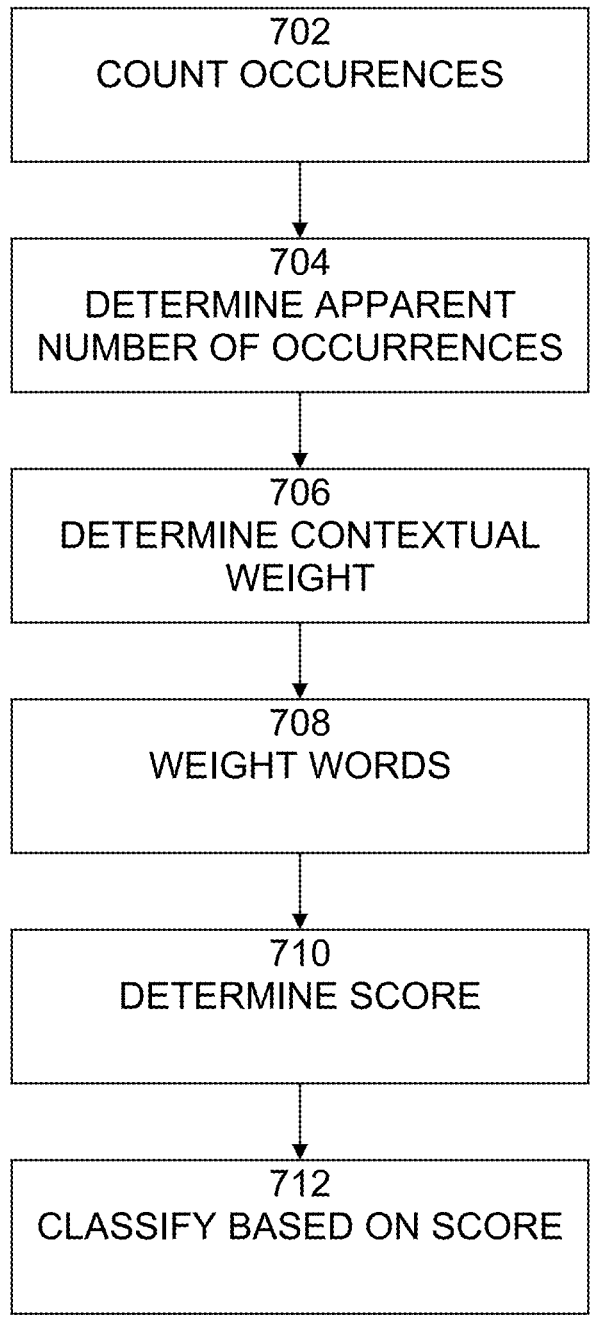
FIG. 7 is an exemplary flow diagram of a process of classification of content according to embodiments of the present systems and methods.

An exemplary flow diagram of a process 700 of classification of content, such as songs, using information such as comments is shown in FIG. 7. Process 700 begins with 702, in which occurrences of words in the comment information may be counted. The words that may be counted here and weighted below may be words for each class obtained from dictionary 232. At 704, the apparent number of occurrences of word x in video v, $n_{xv}$, may be determined according to $n_{xv}=\Sigma_c \log_2 (1+c_x)$, where $c_x$=Number of occurrences of word x in comment c. At 706, the contextual weight, $w_{cxv}$, of each word x with respect to video v may be determined according to $w_{cxv}=n_{xv}\div(n_{xv}-n_{zv})$, where $n_{xv}$=apparent number of occurrences of word x in video v, z=the word with the highest apparent number of occurrences after x. At 708, the weight of each word x for video v may be determined according to $w_{xv}=w_{bx}\times w_{cxv}$, where $w_{xv}$=weight of the word x for video v, $w_{bx}$=base weight of x, $w_{cxv}$=contextual weight of x with respect to v. At 710, class scores, $S_Y(v)$, for each video may be determined according to $S_Y(v)=\Sigma_{x\epsilon Y}\Sigma_c w_{xv}\times \log_2(1+c_x)$, where, $S_Y(v)$=Score of video v to belong to class Y. At 712, each video may be classified based on its class scores according to if $(S_{Ymax}(v)-S_Y(v))\div S_{Ymax}<\eta$, then v is classified into class Y, where $Y_{max}$ is the class having obtained the highest score and η is a measure of overlapping between the classes. In embodiments, u may be empirically chosen to be, for example, 0.4

Process 700 may classify a song based on the emotional words found in the comment section of the song. For example, to classify a relaxing song, process 700 may search for words 802, examples of which are shown in FIG. 8, in the comments of the listeners and based on the scores, the song may be classified as a relaxing one or in other classes. In the example shown in FIG. 8, score 804 may indicate a frequency-based score in relaxing songs and score 806 may indicate the frequency of the same word in rest of the five classes.

Figure 9:
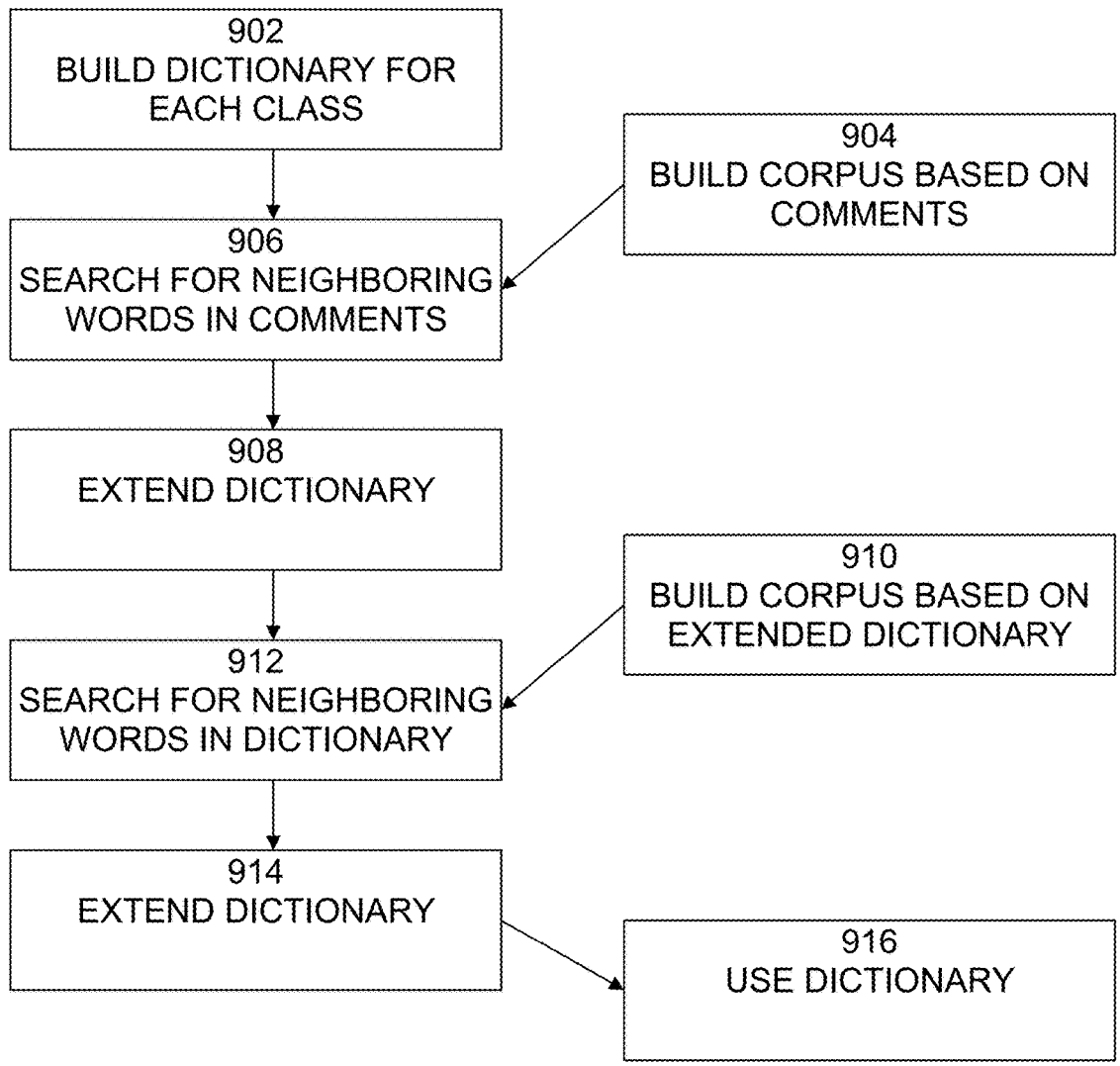
FIG. 9 is an exemplary flow diagram of an embodiment of a process of selecting and ranking emotional words according to embodiments of the present systems and methods.

An exemplary flow diagram of an embodiment of a process 900 of selecting and ranking emotional words is shown in FIG. 9. In embodiments, a 'bait and expand' approach may be used. Process 900 begins with 902, in which a "bait dictionary" for each class may be built. Each dictionary may include a minimum set of words that determines the class. These words may classify content, such as songs, in, for example, six classes. At 904, a corpus based on information relating to content, such as comments about songs, may be built for each class. The corpus for each class may be built based on the words in the bait dictionary for that class. At 906, the corpuses of the words for each of the classes may be searched for words neighboring and/or related to the words in the bait dictionary. At 908, the dictionary may be extended by adding the most frequent words found in the search at 906 to the dictionary. At 910, corpuses for each class may be built based on the extended dictionary. At 912, the corpuses based on the extended dictionary for each of the classes may be searched for words neighboring and/or related to the words in the extended dictionary. At 914, the dictionary may be extended again by adding the most frequent words found in the search at 912 to the dictionary. At 916, the twice-extended dictionary may be used to classify the songs. Iteration of building corpuses and extending dictionaries may continue until all the words in the corpus built from the comments get their relative importance scores based on the classes.

Figure 10:
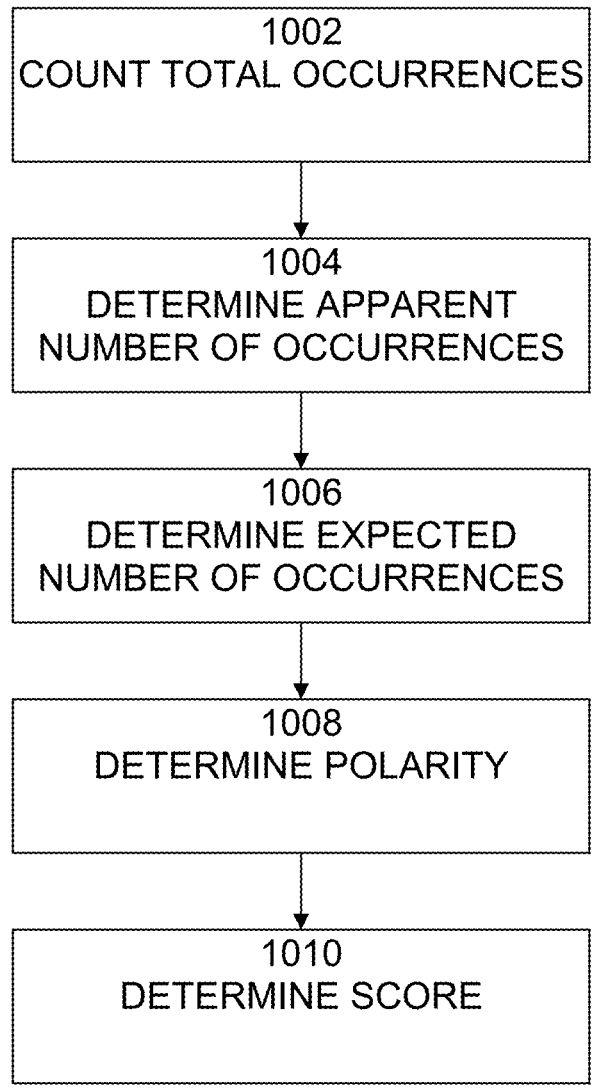
FIG. 10 is an exemplary flow diagram of a process of ranking of the words to indicate a class according to embodiments of the present systems and methods.

An exemplary flow diagram of a process 1000 of ranking of the words to indicate a class is shown in FIG. 10. Process 1000 begins with 1002, in which $N_{xv}$, the total number of occurrences of word x in all comments of video v may be counted. At 1004, the total apparent occurrences of word x in videos belonging to class y, $O_{xy}$, may be determined according to $O_{xy}=E_{v\epsilon y} \log_2(1+N_{xv})$, where $N_{xv}$=total number occurrences of word x in all comments of video v. At 1006, the expected occurrences of x in videos belonging to class y, $E[Z_{xy}]$, may be determined according to $E[Z_{xy}]=N_y \div N^*M_x$, where $N_y$=Total number of words in all comments in all videos of class y, N=Total number of words in all comments in all videos, and $M_x$=Total number of occurrences of word x in all videos. At 1008, the polarity of word x for class y, $I_{xy}$, may be determined according to $I_{xy}=(O_{xy}-E[Z_{xy}])\div |O_{xy}-E[Z_{xy}]|$. At 1010, the score of word x to determine a video to be in class y, $Z_{xy}$, may be determined according to $Z_{xy}=I_{xy}*(O_{xy}-E[Z_{xy}])^2\div E[Z_{xy}]$, where $Z_{xy}$=score of word x to determine a video to be in class y, $O_{xy}$=total apparent occurrences of word x in videos belonging to class y, $E[Z_{xy}]$=expected occurrences of x in videos belonging to class y, and $I_{xy}$=polarity of word x for class y.

Figure 11:
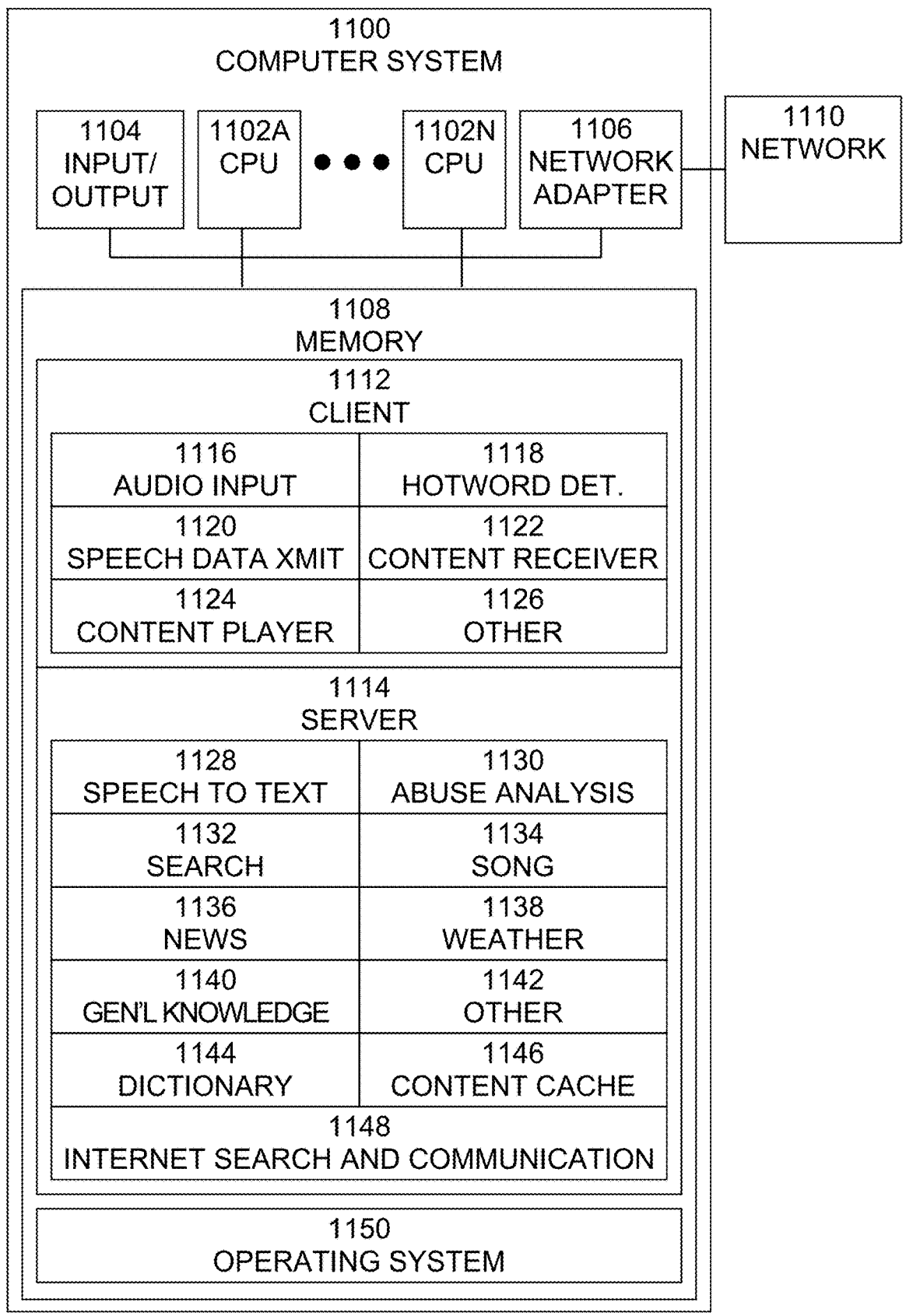
FIG. 11 is an exemplary block diagram of a computer system, in which processes involved in the embodiments described herein may be implemented.

An exemplary block diagram of a computer system 1100, in which processes involved in the embodiments described herein may be implemented, is shown in FIG. 11. Computer system 1102 may be implemented using one or more programmed general-purpose computer systems, such as embedded processors, systems on a chip, personal computers, workstations, server systems, and minicomputers or mainframe computers, or in distributed, networked computing environments. Computer system 1102 may include one or more processors (CPUs) 1102A-1102N, input/output circuitry 1104, network adapter 1106, and memory 1108. CPUs 1102A-1102N execute program instructions in order to carry out the functions of the present communications systems and methods. Typically, CPUs 1102A-1102N are one or more microprocessors, such as an INTEL CORE® processor. FIG. 11 illustrates an embodiment in which computer system 1102 is implemented as a single multi-processor computer system, in which multiple processors 1102A-1102N share system resources, such as memory 1108, input/output circuitry 1104, and network adapter 1106. However, the present communications systems and methods also include embodiments in which computer system 1102 is implemented as a plurality of networked computer systems, which may be single-processor computer systems, multi-processor computer systems, or a mix thereof.

Input/output circuitry 1104 provides the capability to input data to, or output data from, computer system 1102.

For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1106 interfaces device 1100 with a network 1110. Network 1110 may be any public or proprietary LAN or WAN, including, but not limited to the Internet.

Memory 1108 stores program instructions that are executed by, and data that are used and processed by, CPU 1102 to perform the functions of computer system 1102. Memory 1108 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1108 may vary depending upon the function that computer system 1102 is programmed to perform. In the example shown in FIG. 11, exemplary memory contents are shown representing routines and data for embodiments of the processes described above. For example, FIG. 11 includes memory contents for both a client 1112 and a server 1114. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 11, memory 1108 may include memory contents for client 1112 and/or server 1114. Memory contents for client 1112 may include audio input routines 1116, hotword detection routines 1118, speech data transmitting routines 1120, content receiver routines 1122, content player routines 1124, other routines 1126, etc. Memory contents for server 1114 may include speech to text routines 1128, abuse analysis routines 1130, search routines 1132, song search routines 1134, news search routines 1136, weather search routines 1138, general knowledge search routines 1140, other search routines 1142, dictionary routines 1144, content cache routines 1146, and internet search and communication routines 1148.

In the example of client 1112, audio input routines 1116 may include software, and may operate hardware, to receive one or more voice commands, such as a search query, from a user, as described above. Hotword detection routines 1118 may include may include software, and may operate hardware, to perform multiple hotword handling, including wake up client upon hotword detection, as well as recognizing an performing client commands, such as volume up/down, pause, resume, etc., as described above. Speech data transmitting routines 1120 may include may include software, and may operate hardware, to transmit speech data to the server, as described above. Content receiver routines 1122 may include may include software, and may operate hardware, to receive content to be played, as described above. Content player routines 1124 may include may include software, and may operate hardware, to play, display, or otherwise provide content to a user, as described above. Other routines 1126 may include may include software, and may operate hardware, to perform other functions that may be included in the client.

In the example of client 1114, speech to text routines 1128 may include may include software, and may operate hardware, to, as described above. Abuse analysis routines 1130 may include may include software, and may operate hardware, to analyze voice commands and/or content for abusive language, as described above. Search routines 1132 may include may include software, and may operate hardware, to perform searching for content responsive to the search query, as described above. Song search routines 1134 may include may include software, and may operate hardware, to search for song content, as described above. News search routines 1136 may include may include software, and may operate hardware, to search for news content, as described above. Weather search routines 1138 may include may include software, and may operate hardware, to search for weather content, as described above. General knowledge search routines 1140 may include may include software, and may operate hardware, to search for general knowledge content, as described above. Other search routines 1142 may include may include software, and may operate hardware, to search for other content, as described above. Dictionary routines 1144 may include may include software, and may operate hardware, to generate and operate a dictionary, as described above. Content cache routines 1146 may include may include software, and may operate hardware, to cache content found as a result of searches that were performed, as described above. Internet search and communication routines 1148 may include may include software, and may operate hardware, to communicate with the Internet and perform searches, as described above.

Operating system 1150 may provide overall system functionality.

As shown in FIG. 11, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
receiving, at a voice controlled device, a voice input from a user, wherein the voice input is in at least one of a plurality of languages;
receiving, at a server computer system comprising a processor, memory accessible by the processor, and computer program instructions stored in the memory and executable by the processor, the voice input and converting the voice input to text data representing the voice input, wherein the text data includes text data in the at least one of the plurality of languages;
obtaining, at the server computer system, a plurality of items of content responsive to the voice input by searching for content using the text data;
determining, at the server computer system, at least one class related to the voice input;
classifying, at the server computer system, each obtained item of content into at least one class, wherein each obtained item of content is classified into at least one class using text data associated with each item of content by:
counting, at the server computer system, occurrences of words in the text data associated with each item of content, wherein the counted words are included in a dictionary for each class including a ranking of emotional words,
determining, at the server computer system, an apparent number of occurrences of each word in the text data associated with each item of content,
determining, at the server computer system, a contextual weight of each word in the text data associated with each item of content with respect to the item of content,
determining, at the server computer system, a weight of each word in the text data associated with each item of content;
determining, at the server computer system, a score for each class for each item of content based on the counted occurrences of words, the determined apparent number of occurrences of each word, the determined contextual weight of each word, and the determined weight of each word and
classifying, at the server computer system, each item of content into at least one class based on the determined score for each class;
identifying, at the server computer system, at least one item of content classified into at least one class related to the voice input; and
transmitting, at the server computer system, the at least one identified item of content.

2. The method of claim 1, wherein the voice input is in more than one of the plurality of languages.

3. The method of claim 2, wherein the classes relate to emotional states and the at least one class related to the voice input is an emotional state of the user determined by analyzing the text.

4. The method of claim 3, wherein the dictionary is obtained by:
for each class, building, at the server computer system, a dictionary including a minimum set of words that determines the class;
building, at the server computer system, a corpus of text data associated with a plurality of items of content;
searching, at the server computer system, the corpus of text data to find words neighboring or related to word in the dictionary; and
extending, at the server computer system, the dictionary to include the words found in the search.

5. The method of claim 4, further comprising repeating the building, searching, and extending until all words in the corpus have relative importance scores based on the classes.

6. A server computer system comprising a processor, memory accessible by the processor, and computer program instructions stored in the memory and executable by the processor to perform:
receiving a voice input from a user of the voice controlled device from the voice controlled device at the server computer system and converting the voice input to text data representing the voice input, wherein the voice input is in at least one of a plurality of languages and wherein the text data includes text data in the at least one of the plurality of languages;
obtaining a plurality of items of content responsive to the voice input by searching for content using the text data;
determining at least one class related to the voice input;
classifying each obtained item of content into at least one class, wherein each obtained item of content is classified into at least one class using text data associated with each item of content by:
counting, at the computer system, occurrences of words in the text data associated with each item of content, wherein the counted words are included in a dictionary for each class including a ranking of emotional words,
determining, at the computer system, an apparent number of occurrences of each word in the text data associated with each item of content,
determining, at the computer system, a contextual weight of each word in the text data associated with each item of content with respect to the item of content,
determining, at the computer system, a weight of each word in the text data associated with each item of content;
determining, at the computer system, a score for each class for each item of content based on the counted occurrences of words, the determined apparent number of occurrences of each word, the determined contextual weight of each word, and the determined weight of each word and
classifying, at the computer system, each item of content into at least one class based on the determined score for each class;
identifying at least one item of content classified into at least one class related to the voice input; and
transmitting the at least one identified item of content.

7. The system of claim 6, wherein the voice input is in more than one of the plurality of languages.

8. The system of claim 7, wherein the classes relate to emotional states and the at least one class related to the voice input is an emotional state of the user determined by analyzing the text.

9. The system of claim 8, wherein the dictionary is obtained by:
for each class, building a dictionary including a minimum set of words that determines the class;
building a corpus of text data associated with a plurality of items of content;
searching the corpus of text data to find words neighboring or related to word in the dictionary; and
extending the dictionary to include the words found in the search.

10. The system of claim 9, further comprising repeating the building, searching, and extending until all words in the corpus have relative importance scores based on the classes.

11. A computer program product comprising a non-transitory computer readable storage having program instructions embodied therewith, the program instructions executable by a server computer system comprising a processor, memory accessible by the processor, and computer program instructions stored in the memory and executable by the processor, to cause the server computer system to perform a method comprising:

receiving, at the computer system, a voice input from a user of the voice controlled device from the voice controlled device at the server computer system and converting the voice input to text data representing the voice input, wherein the voice input is in at least one of a plurality of languages and wherein the text data includes text data in the at least one of the plurality of languages;

obtaining, at the server computer system, a plurality of items of content responsive to the voice input by searching for content using the text data;

determining, at the server computer system, at least one class related to the voice input;

classifying, at the server computer system, each obtained item of content into at least one class, wherein each obtained item of content is classified into at least one class using text data associated with each item of content by:

counting, at the server computer system, occurrences of words in the text data associated with each item of content, wherein the counted words are included in a dictionary for each class including a ranking of emotional words, determining, at the server computer system, an apparent number of occurrences of each word in the text data associated with each item of content, determining, at the server computer system, a contextual weight of each word in the text data associated with each item of content with respect to the item of content, determining, at the server computer system, a weight of each word in the text data associated with each item of content;

determining, at the server computer system, a score for each class for each item of content based on the counted occurrences of words, the determined apparent number of occurrences of each word, the determined contextual weight of each word, and the determined weight of each word and classifying, at the server computer system, each item of content into at least one class based on the determined score for each class;

identifying, at the server computer system, at least one item of content classified into at least one class related to the voice input; and transmitting, at the server computer system, the at least one identified item of content.

12. The computer program product of claim 11, wherein the voice input is in more than one of the plurality of languages.

13. The computer program product of claim 12, wherein the classes relate to emotional states and the at least one class related to the voice input is an emotional state of the user determined by analyzing the text.

14. The computer program product of claim 13, wherein the dictionary is obtained by:

for each class, building, at the server computer system, a dictionary including a minimum set of words that determines the class;

building, at the server computer system, a corpus of text data associated with a plurality of items of content;

searching, at the server computer system, the corpus of text data to find words neighboring or related to word in the dictionary;

extending, at the server computer system, the dictionary to include the words found in the search; and repeating the building, searching, and extending until all words in the corpus have relative importance scores based on the classes.

\* \* \* \* \*